Figure 1:
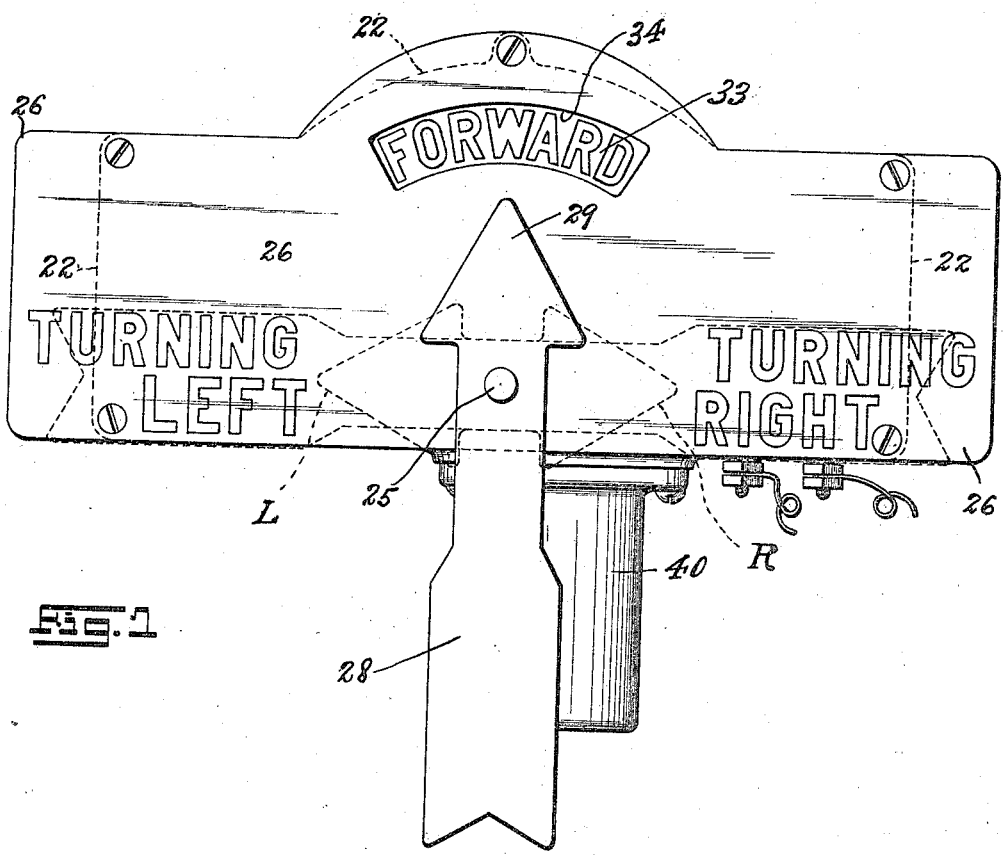

W. D. C. WRIGHT.
SIGNALING DEVICE FOR VEHICLES.
APPLICATION FILED JULY 29, 1914.

1,155,026.

Patented Sept. 28, 1915.
2 SHEETS—SHEET 1.

WITNESSES:

INVENTOR
Wilson D. Craig Wright,
BY
ATTORNEYS

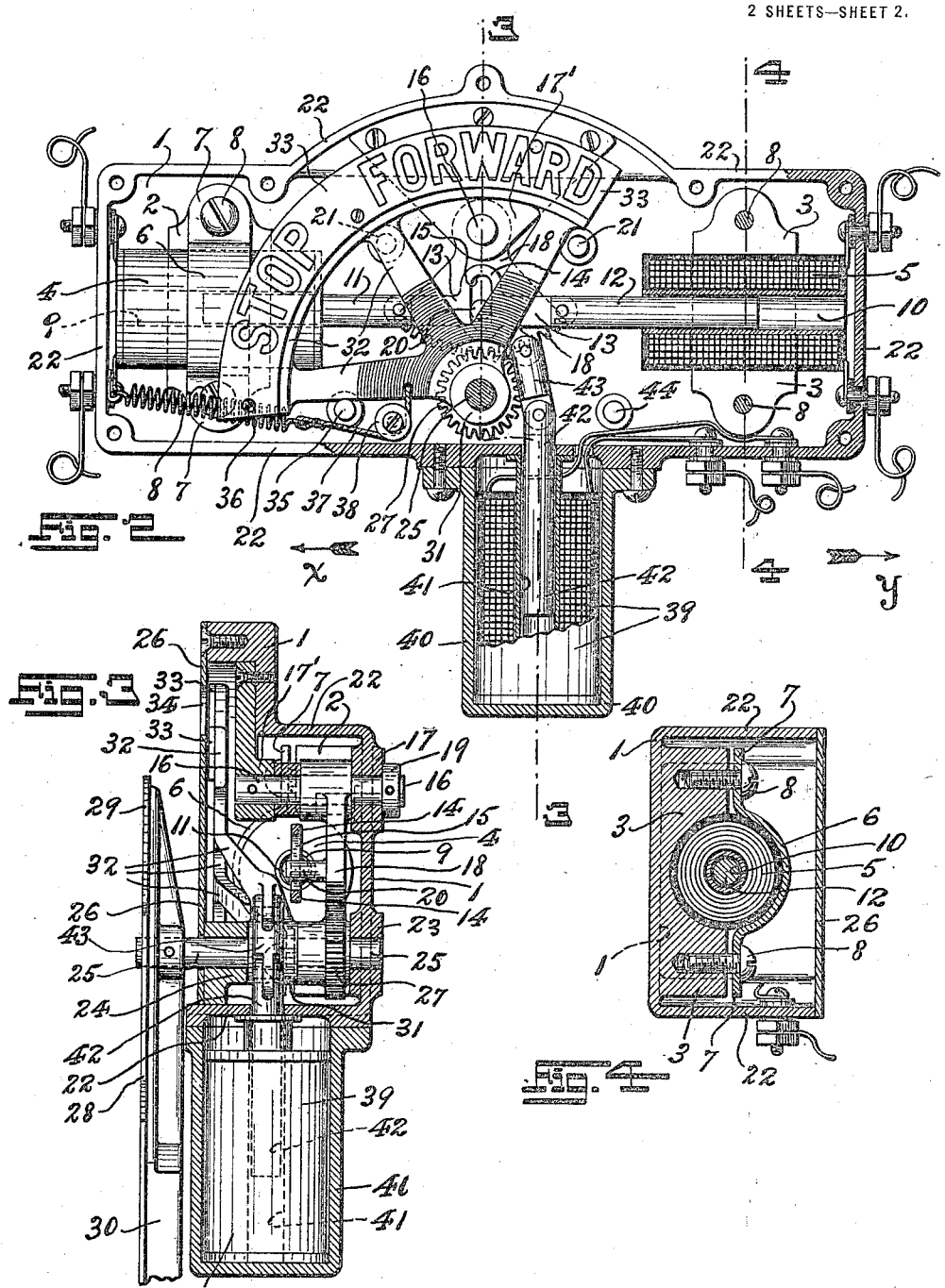

UNITED STATES PATENT OFFICE.

WILSON D. CRAIG WRIGHT, OF PHILADELPHIA, PENNSYLVANIA.

SIGNALING DEVICE FOR VEHICLES.

1,155,026.

Specification of Letters Patent. Patented Sept. 28, 1915.

Application filed July 29, 1914. Serial No. 853,814.

*To all whom it may concern:*

Be it known that I, WILSON D. CRAIG WRIGHT, a citizen of the United States, residing at Philadelphia, in the county of Philadelphia and State of Pennsylvania, have invented certain new and useful Improvements in Signaling Devices for Vehicles; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in signaling apparatus; and, the invention has reference, more particularly, to a novel, simply constructed, and easily operated rear-end signal device for moving vehicles, and more especially for use on motor-vehicles.

The invention has for its principal object to provide a novel, simple, and cheap construction of automatic signal device for attachment to the rear-ends of automobiles or other vehicles, adapted to indicate the intention of the driver of the automobile to stop, or to turn either to the right or left, or to continue to travel straight ahead, in order to warn vehicles behind the automobile in advance of the indicated movement of the latter.

The invention has for a further object to simplify the construction of signaling apparatus of the character above described to reduce as far as possible any complication of mechanism, at the same time, however, providing for a quick, certain and positive action of the apparatus, and to thereby minimize liability to disarrangement of the mechanism whereby the same may become inoperative.

Other objects of the present invention, not at this time more particularly enumerated, will be clearly understood from the following detailed description of the said invention.

The said invention consists, primarily, in the novel rear-end signaling apparatus for vehicles hereinafter set forth; and, furthermore, the invention consists in the several novel arrangements and combinations of the various parts of the same, as well as in the details of the construction of said parts, all of which will be more fully described in the following specification, and then finally embodied in the claims which are appended to and which form an essential part of said specification.

The invention is clearly illustrated in the accompanying drawings, in which:—

Figure 1 is a face view of the novel rear-end signaling apparatus made according to and embodying the principles of the present invention. Fig. 2 is a face view of the casing of said signaling apparatus, the face-plate being removed, and illustrating the internal operating mechanism of the same in part elevation and part section. Fig. 3 is a vertical cross section looking in the direction of the arrow $x$, and taken on line 3—3 in said Fig. 2. Fig. 4 is another vertical cross section taken on line 4—4 in said Fig. 2, looking in the direction of the arrow $y$.

Similar characters of reference are employed in all of the above described views to illustrate corresponding parts.

Referring now to the said drawings, the reference character 1 indicates a casing upon and in which the novel signaling apparatus is mounted, said casing being secured in any suitable manner to some visible portion of the rear end of an automobile or other vehicle. Mounted on the rear wall of casing 1 adjacent to each end of the same are supporting blocks 2 and 3, the same being adapted to receive and support, respectively, a solenoid 4 for operating the signaling mechanism for left turn indication, and a solenoid 5 for operating the signaling mechanism for right turn indication. Each solenoid 4 and 5 is retained in supported relation upon its supporting block by means of a yoke-piece 6 adapted to embrace the solenoid, and the perforated ears 7 of which are secured to said respective supporting-blocks by means of fastening-screws 8, or any other suitable fastening means. Arranged to extend slidably into the respective openings 9 and 10 of said solenoids 4 and 5, are the respective armature pieces 11 and 12 of the latter. The outer ends of said armature pieces 11 and 12 are joined together by means of a connecting piece 13, the same having a centrally disposed and vertically extending enlargement 14 in which is formed a vertical elongated slot 15.

The reference character 16 indicates a spindle which is rotatably mounted at one end in a suitably disposed bearing-portion 17 formed in said casing 1 and at the other end in a bearing bracket 17'. Secured upon the said spindle 16 is a segmental gear-member 18. The rearwardly projecting end of said spindle 16 is provided with a collar 19 fixed thereon to prevent the withdrawal of said spindle from its bearing portion 17. Projecting outwardly from said segmental gear-member 18 is a pin or stud 20 the free end of which enters and rides in the slot 15 of said connecting piece 13 which joins together the said armature pieces 11 and 12. Extending from said rear wall of said casing 1, so as to project on either side of said segmental gear-member 18 are stop-studs 21 against either of which said segmental gear-member is brought to rest after operation according to the direction of its movement, said stop-studs serving to limit the operative movement of said segmental gear-member.

The reference character 22 indicates the side and end walls of said casing 1 which extend over and inclose the internal operating mechanism of the signaling apparatus.

Journaled at one end in a bearing-portion 23, formed in said rear wall of said casing 1, and at the other end in a bearing-bracket 24, connected with the side wall 22 of said casing 1, is a shaft 25, the forward end of which extends through a face-plate 26 which is connected with the open front side of said casing 1, and which covers over the interior mechanism contained therein, said shaft 25 thus projecting exteriorly beyond said face-plate 26. Fixed upon said shaft 25 is a pinion 27 with which said segmental gear-member 18 meshes, whereby the oscillation of the latter may cause a rotation of said pinion 27 and shaft 25. Fixed upon the exterior end of said shaft 25, so as to be rotated thereby, is an indicating arrow or pointer member 28. Inscribed in any suitable manner upon the exterior side of said face plate 26, are the signaling expressions "Turning Left" and "Turning Right," as shown in Fig. 1, but it will be clearly evident that said indicating arrow or pointer member 28 by its direction of extension will alone signify the purport of the vehicle driver's intention without necessity of such inscriptions, hence they may be dispensed with if so desired.

Of course it will be understood that the respective solenoids 4 and 5 are connected in circuit with some suitable source of electrical energy, such as a battery or the like, and also that the said circuit may be controlled by means of suitable switch mechanism, whereby the respective solenoids may be selectively energized.

Normally the indicating arrow or pointer member 28 stands in vertical position, as shown by the full lines in Fig. 1 of the drawings. If it is the driver's intention to turn to the left, before proceeding to do so he switches the electric current so as to electrify the solenoid 4 for operating the mechanism for left turning indication. The attractive force of the solenoid 4 then acting upon the armature 11 thereof draws the latter toward the solenoid, and consequently the connecting-piece 13 transmits this motion through the pin or stud 20 to said segmental gear member 18, thereby causing an oscillation of the latter which in turn rotates said pinion 27, shaft 25, and consequently causes a quarter turn or rotation of said indicating arrow or pointer member 28, which turns its head 29 to the left, the arrow or pointer member 28 thereupon occupying a horizontal position pointing to the left, as indicated by the dotted representation L in said Fig. 1.

After the turn has been made the switch mechanism is shifted to cut off the electric current from said solenoid 4, whereupon its attractive force ceases to operate upon the armature 11, so that the arrow or indicating pointer 28 returns to normal initial vertical position, one end of the same being supplied with a weight 30, whereby the force of gravity acting upon the weighted end of the arrow or pointing member 28 causes the return rotation of the same and the operating mechanism connected therewith.

When it is the driver's intention to turn to the right he switches the electric current so as to electrify the solenoid 5 for operating the mechanism for right turning indication, and the attractive force of the solenoid 5 acting upon the armature 12, causes an opposite oscillation of said segmental gear member 18 and the transmission device interconnecting the same with said arrow or pointer member 28. whereby the latter is rotated to point to the right, as indicated by the dotted representation R thereof illustrated in said Fig. 1.

The reference character 31 indicates the hub of a semaphore frame 32 upon which is fixed a signal-plate 33 bearing the signal inscriptions "Stop" and "Forward." Said hub 31 is journaled to rotate or turn freely on said shaft 25 as a pivot and independent thereof. Said face-plate 26 is provided with a suitably disposed aperture 34, through which one of said signal inscriptions is visible and may be read, according to the position of said semaphore frame 32. Said semaphore frame is normally maintained in such a position that the signal inscription "Forward" is visible through the aperture 34 while the vehicle is in motion. This normal position is fixed by the contact of said semaphore frame with the stop-pin 35, and is maintained by means of a pull-spring 36, the free end of which is connected by means of a flexible cord 37 running over an idler-roller 38 and suitably connected with a portion of said semaphore frame. Said semaphore frame is operated through the agency of a solenoid 39 which is inclosed in a casing 40 secured to and depending from said main casing 1 in a suitable location, and so as to maintain said solenoid 39 in a vertical position. Slidably disposed in the opening 41 of said solenoid 39 is the armature 42 of said solenoid, the upper free end of which is pivotally connected by means of an interconnecting link-member 43 with said semaphore frame 32. When an electric current is switched into and through said solenoid 39 so that the same is energized, its attractive force operates upon said armature 42 to move the latter downwardly, thereby giving a downward pull to said semaphore frame 32 which causes the same to rotate until it engages the stop-pin 44. When stopped after such rotation the semaphore frame has been moved so as to register the signaling inscription "Stop" so that the same is visible through the aperture 34, and consequently by such operation of the signaling device the driver's intention to stop his moving vehicle is quickly indicated to persons in or driving upon the roadway in his rear, so that they may be warned in a timely manner to govern their own vehicles in accordance with the intention thus signaled.

It will be apparent from the above description of my novel signal device that the same will readily, easily, and intelligently signal a vehicle driver's intention to make any of the ordinary movements with his vehicle prior to the actual fulfillment of said intention, and the device is easily and simply controlled by the driver to produce the desired signal.

The mechanism is exceedingly simple and the long attractive movement of the solenoids upon the armatures permits of a very direct transmission of power for moving the arrow or pointer member and said semaphore device, without complication of parts, and with but slight expense of electric energy.

I am aware that some changes may be made in the arrangements and combinations of the several devices and parts of my present invention without departing from the scope of the same as described in the foregoing specification, and as defined in the claims appended thereto. Hence, I do not limit my invention to the exact arrangements and combinations of the various devices and parts as herein set forth, and as illustrated in the accompanying drawings, nor do I confine myself to the exact details of the construction of the said parts.

I claim:—

In a signaling device a casing, a pair of oppositely facing solenoids provided with movable armature pieces, a connecting-piece between the outer ends of said armature pieces, said connecting-piece having a centrally disposed vertical slot, a segmental gear pivotally mounted in said casing, a stud on said segmental gear adapted to enter said slot, a stop on each side of said segmental gear for limiting its oscillation, a shaft, an indicating pointer mounted on said shaft, one end of said indicating pointer having a weight for normally maintaining and returning said indicating pointer in vertical position, and a pinion on said shaft meshing with said segmental gear.

In testimony, that I claim the invention set forth above I have hereunto set my hand this twenty-fifth day of July, 1914.

WILSON D. CRAIG WRIGHT.

Witnesses:
LORENZO J. RILEY,
HENRY A. TUMELTY.

Copies of this patent may be obtained for five cents each, by addressing the "Commissioner of Patents, Washington, D. C."